United States Patent Office 3,346,552
Patented Oct. 10, 1967

3,346,552
MONOAZO DYES FOR SYNTHETIC FIBERS
James M. Straley, David J. Wallace, and Max A. Weaver, Kingsport, Tenn., assignors to Eastman Kodak Company, Rochester, N.Y., a corporation of New Jersey
No Drawing. Filed Aug. 17, 1964, Ser. No. 390,211
10 Claims. (Cl. 260—158)

ABSTRACT OF THE DISCLOSURE

Benzothiazolylazophenyl compounds are useful as dyes for hydrophobic textile materials and are characterized by a heterocyclic group attached to the coupler moiety and having the formula $$-\overset{\frown}{N}-\underset{\underset{O}{\|}}{C}-Z$$

wherein Z represents the carbon atoms completing a pyrrolidinono radical, a piperidono radical, or a phthalimidino radical.

---

This invention relates to azo compounds particularly useful as dyes for textile fibers.

The azo compounds have the following general formula $$R-N=N-R_1-N\underset{R_3-\underset{\underset{O}{\|}}{N}-\underset{\underset{O}{\|}}{C}-Z}{\overset{R_2}{\diagdown}}$$

wherein R represents a 2-benzothiazolyl radical unsubstituted or substituted, ie., $$Ar\underset{S}{\overset{N}{\diagup\!\!\!\diagdown}}C-$$

in which Ar is an ortho-arylene radical of the benzene series, including ortho-phenylene and ortho-phenylene substituted by radicals such as alklsulfonyl, e.g., lower alkylsulfonyl, nitro, aliphatic acylamido, e.g., acetamido, cyano, thiocyano, sulfonamido, sulfonyl, lower cyanoalkylsulfonyl, halogen, lower alkylsulfonamido, lower alkoxy, lower alkyl, lower hydroxyalkyl, lower alkylthio, lower trifluoroalkyl, lower cyanoalkyl, lower carbalkoxy. $R_1$ represents a phenylene radical including, for example, o-, m- and p-phenylene radicals and o-, m- and p-phenylene radicals substituted with groups such as alkyl and substituted alkyl particularly lower alkyl of 1 to 4 carbon atoms, e.g. m-tolylene m-tolylene—⟨ ⟩—
             |
            CH₃ alkoxy and substtuted alkoxy particularly lower alkoxy of 1 to 4 carbon atoms, acylamido such as acetamido, halogen including chlorine and bromine.
$R_2$ represents hydrogen or an alkyl radical especially lower alkyl of 1 to 4 carbon atoms, and substituted alkyl such as lower hydroxyalkyl, lower alkoxyalkyl, lower acyloxyalkyl, lower alkylsulfonyl, lower carboxamidoalkyl, lower cyanoalkyl, lower chloroalkyl and bromoalkyl, lower acetoxyalkyl, lower carbalkoxyalkyl, $R_3$ represents lower alkylene of 1 to 4 carbon atoms. Z represents a chain of carbon atom which together with $$-\overset{|}{N}-\underset{\underset{O}{\|}}{C}-$$

are necessary to complete a pyrrolidinono radical, a piperidono radical, or a phthalimidino radical, such as propylene, iso-propylene, butylene, $$\underset{CH_2}{\diagdown\!\!\!\diagup}\quad \underset{CH_2}{\diagdown\!\!\!\diagup}-Cl \quad \underset{CH_2}{\diagdown\!\!\!\diagup}-OCH_3$$

in which the atoms represented by Z are a part of a fused-on benzene radical.

The azo compounds are prepared by diazotization in known manner of a 2-aminobenzothiazole and coupling with coupling components having the formula $$H-R_1-N\underset{R_3-\underset{\underset{O}{\|}}{N}-\underset{\underset{O}{\|}}{C}-Z}{\overset{R_2}{\diagdown}}$$

wherein $R_1$, $R_2$, $R_3$ and Z have the meaning given above.

The above coupling components in which the ring $$-\overset{\frown}{N}-\underset{\underset{O}{\|}}{C}-Z$$

is monocyclic, can be prepared by reacting aniline or an aniline derivative with butyrolactones or caprolactones as described in our co-filed U.S. patent application Ser. No. 390,212. For example, butyrolactone can be refluxed with an N-β-aminoethylaniline compound with removal of water to obtain the corresponding N-β-pyrrolidinonoethylaniline compound. The above coupling components in which the ring $$-\overset{\frown}{N}-\underset{\underset{O}{\|}}{C}-Z$$

is bi-cyclic can be prepared by reacting an N-aminoalkylaniline with phthalide or substituted phthalides such as chlorophthalide or an alkoxyphthalide, as described in our above co-filed application. For example, an N-β-ethylaniline compound and phthalide can be heated in the presence of sulfanilic acid while water is removed to yield the corresponding N-β-phthalimidinoethylaniline compound.

The azo compounds can be expected to possess properties distinct from similar azo compounds in which the ring $$-\overset{\frown}{N}-\underset{\underset{O}{\|}}{C}-Z$$

is connected directly to the benzene nucleus of a coupler in that they have better affinity and light fastness for polyesters.

2-aminobenzothiazole,
2-amino-6-methylsulfonylbenzothiazole,
2-amino-6-ethylsulfonylbenzothiazole,
2-amino-6-n-propylsulfonylbenzothiazole,
2-amino-6-n-butylsulfonylbenzothiazole,
2-aminobenzothiazole-6-N-methylsulfonamide,
2-aminobenzothiazole-6-N-ethylsulfonamide,
2-aminobenzothiazole-6-N-n-propylsulfonamide,
2-aminobenzothiazole-6-N-n-butylsulfonamide,
2-amino-5-methoxybenzothiazole,
2-amino-6-methoxybenzothiazole,
2-amino-6-ethoxybenzothiazole,
2-amino-6-n-propoxybenzothiazole,
2-amino-6-n-butoxybenzothiazole,
2-amino-4-methylbenzothiazole,
2-amino-6-methylbenzothiazole,
2-amino-6-ethylbenzothiazole,
2-amino-6-n-propylbenzothiazole,
2-amino-6-n-butylbenzothiazole,
2-amino-6-β-hydroxyethylbenzothiazole,
2-amino-6-γ-hydroxypropylbenzothiazole, 2-amino-6-δ-hydroxybutylbenzothiazole,
2-amino-6-acetylaminobenzothiazole,
2-amino-6-n-propionylaminobenzothiazole,
2-amino-6-n-butyrylaminobenzothiazole,
2-amino-6-thiomethylbenzothiazole,
2-amino-6-thiocyanobenzothiazole,
2-amino-6-cyanobenzothiazole,
2-amino-6-trifluoromethylbenzothiazole,
2-amino-6-chlorobenzothiazole,
2-amino-4,6-dichlorobenzothiazole,
2-amino-6-nitrobenzothiazole,
2-amino-4,7-dimethoxybenzothiazole,
2-amino-5,6-dimethoxybenzothiazole,
2-amino-4,7-diethoxybenzothiazole,
2-amino-6-β-cyanoethylthiobenzothiazole,
2-amino-6-β-cyano-n-propylthiobenzothiazole,
2-amino-6-γ-cyanopropylthiobenzothiazole,
2-amino-6-β-cyanoethylsulfonylbenzothiazole,
2-amino-6-γ-cyanopropylsulfonylbenzothiazole,
2-amino-6(β,γ-dihydroxypropylthio)benzothiazole,
2-amino-6(β,γ-dihydroxypropylsulfonyl)benzothiazole,
2-amino-6-β-carboxyethylthiobenzothiazole,
2-amino-6-β-carbamylethylthiobenzothiazole,
2-amino-6-β-dimethylcarbamylisopropylthiobenzo-
    thiazole and
2-amino-4,6-dimethylbenzothiazole are representative of the 2-aminobenzothiazole compounds used in the preparation of the azo compounds of our invention.

The azo compounds can be used for dyeing textile materials including synthetic polymer fibers, yarns and fabrics giving fast shades when applied by convention dyeing methods to cellulose ester, polyamide and polyester fibers. When the azo compounds are used for dyeing such hydrophobic materials, they should be free of water-solubilizing groups such as sulfo and carboxyl groups. In general, the dyes have good fastness, for example, to light, washing, gas (atmospheric fumes) and sublimation.

The following examples will serve to illustrate the preparation of representative intermediates and azo compounds of our invention.

*Example 1*

6.84 g. 2-amino-6-methylsulfonylbenzothiazole was suspended in 72 ml. water and 42.8 ml. conc. $H_2SO_4$ was added, with stirring. The amine dissolved. The solution was cooled to $-5°$ C. and a solution of 2.52 g. $NaNO_2$ in 15 ml. conc. $H_2SO_4$ was added portionwise, keeping the temperature below 0° C. The diazotization was stirred 1.75 hr. at 0° C., then added, with stirring to a solution of 7.38 g. of 1-[β-(N-ethyl-N-m-toluidino)aminoethyl]-2-pyrrolidinone in 100 ml. 15% $H_2SO_4$, all at about 5° C. The coupling was continued at this temperature for 2 hr., then drowned with water, filtered, washed with water, and dried. The product dyes cellulose acetate and polyester fibers a brilliant red-violet shade with excellent fastness properties. The product has the formula

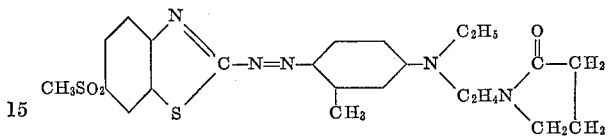

*Example 2*

0.76 g. sodium nitrite was added portionwise to 5 ml. conc. $H_2SO_4$. This solution was cooled in an ice bath and 10 ml. 1:5 acid was added, keeping the temperature below 20° C. This solution was cooled to 5° C. and 1.75 g. 2-amino-6-cyanobenzothiazole was added, followed by 10 ml. 1:5 acid (1 part propionic:5 acetic). The mixture was stirred 2.5 hr. at ice-bath temperature. It was then added, with stirring to a chilled solution of 2.71 g. 1-[β-(N-β-cyanoethyl - N-m-toluidino)aminoethyl]-2-pyrrolidinone in 25 ml. 1:5 acid. The coupling was neutralized with solid ammonium acetate and allowed to react at ice-bath temperature for 2 hr., at room temperature for .5 hr. It was then drowned with water, filtered, washed with water, and dried. The product dyes cellulose acetate and polyester fibers deep red shades of excellent fastness. The product has the formula

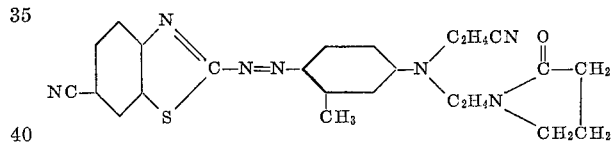

In the manner of the above examples additional azo compounds having the formula designated above are prepared by coupling the diazotized 2-aminobenzothiazole with the coupler indicated in the following table, thus the method of Example 2 can be used to prepare the compound of Example 6 and the method of Example 5 can be used for preparing the compound of Example 35.

| Example | Substituent on R | Coupler Component | | | | Color |
|---|---|---|---|---|---|---|
| | | $R_1$ | $R_2$ | $R_3$ | Z | |
| 3 | 6-$CH_3SO_2$— | Phenylene | —$CH_2CH_2CN$ | —$CH_2CH_2$— | —$CH_2CH_2CH_2$— | Red. |
| 4 | 6-$CH_3SO_2$— | m-Tolylene | —$CH_2CH_2CN$ | —$CH_2CH_2$— | —$CH_2CH_2CH_2$— | Red. |
| 5 | 6-$CH_3SO_2$— | m-$CH_3O$-phenylene | —$CH_2CH_2CN$ | —$CH_2CH_2$— | —$CH_2CH_2CH_2$— | Violet. |
| 6 | 6-$CH_3SO_2$— | m-Cl-phenylene | —$CH_2CH_2CN$ | —$CH_2CH_2$— | —$CH_2CH_2CH_2$— | Red. |
| 7 | 6-$CH_3SO_2$— | 2-$CH_3O$—S—$CH_3$-phenylene | —$C_2H_5$ | —$CH_2CH_2$— | —$CH_2CH_2CH_2$— | Violet. |
| 8 | 6-$CH_3SO_2$— | m-$NHCOCH_3$ phenylene | —$C_2H_5$ | —$CH_2CH_2$— | —$CH_2CH_2CH_2$— | Do. |
| 9 | 6-$CH_3SO_2$— | o-Tolylene | H | —$CH_2CH_2$— | —$CH_2CH_2CH_2$— | Red. |
| 10 | 6-$CH_3SO_2$— | 2,5-di-$OCH_3$ phenylene | —$C_2H_5$ | —$CH_2CH_2$— | —$CH_2CH_2CH_2$— | Violet. |
| 11 | 6-CN | m-Tolylene | —$CH_2CH_2OH$ | —$CH_2CH_2$— | —$CH_2CH_2CH_2$— | Red. |
| 12 | 6-CN | do | —$CH_2CH_2Cl$ | —$CH_2CH_2$— | —$CH_2CH_2CH_2$— | Red. |
| 13 | 6-CN | do | —$CH_2CH_2OCH_3$ | —$CH_2CH_2$— | —$CH_2CH_2CH_2$— | Red. |
| 14 | 6-CN | do | —$CH_2CH_2CO_2C_2H_5$ | —$CH_2CH_2$— | —$CH_2CH_2CH_2$— | Red. |
| 15 | 6-CN | do | —$CH_2CH_2CH_2Br$ | —$CH_2CH_2$— | —$CH_2CH_2CH_2$— | Red. |
| 16 | 6-CN | do | —$CH_2CH_2SO_2CH_3$ | —$CH_2CH_2$— | —$CH_2CH_2CH_2$— | Red. |
| 17 | 6-CN | do | H | —$CH_2CH_2$— | —$CH_2CH_2CH_2$— | Red. |
| 18 | 6-CN | do | —$CH_2CH_2CONH_2$ | —$CH_2CH_2$— | —$CH_2CH_2CH_2$— | Red. |
| 19 | 6-$NO_2$ | do | —$C_2H_5$ | —$CH_2CH_2CH_2$— | —$CH_2CH_2CH_2$— | Violet. |
| 20 | 6-$NO_2$ | do | —$C_2H_5$ | —$CH_2\overset{CH_3}{C}HCH_2$— | —$CH_2CH_2CH_2$— | Do. |
| 21 | 6-$SO_2NH_2$ | do | —$C_2H_5$ | —$CH_2CH_2$— | —$\overset{CH_3}{C}HCH_2CH_2$— | Pink. |
| 22 | 6-$SO_2NH_2$ | do | —$C_2H_5$ | —$CH_2CH_2$— | —$CH_2CH_2CH_2CH_2$— | Do. |
| 23 | 6-$SO_2NH_2$ | do | —$C_2H_5$ | —$CH_2CH_2$— | —$CH_2$—⬡ | Do. |

| Example | Substituent on R | Coupler Component | | | | Color |
|---|---|---|---|---|---|---|
| | | $R_1$ | $R_2$ | $R_3$ | Z | |
| 24 | 6-$SO_2NH_2$ | m-Tolylene | —$C_2H_5$ | —$CH_2CH_2$— | —$CH_2$—⟨⟩—Cl | Pink. |
| 25 | 6-$SO_2NH_2$ | ...do... | —$C_2H_5$ | —$CH_2CH_2$— | —$CH_2$—⟨⟩—$OCH_3$ | Do. |
| 26 | 6-$SO_2CH_2CH_2OH$ | ...do... | —$C_2H_5$ | —$CH_2CH_2$— | —$CH_2$—⟨⟩—$OCH_3$ | Do. |
| 27 | 6-$SO_2CH_2CH_2OH$ | ...do... | —$C_2H_4CN$ | —$CH_2CH_2$— | —$CH_2CH_2CH_2$— | Do. |
| 28 | 6-$SO_2C_4H_9$ | ...do... | —$C_2H_4CN$ | —$CH_2CH_2$— | —$CH_2CH_2CH_2$— | Do. |
| 29 | 6-$SO_2C_4H_9$ | ...do... | —$C_2H_5$ | —$CH_2CH_2$— | —$CH_2CH_2CH_2$— | Do. |
| 30 | 6-$SO_2CH_2CH_2CN$ | ...do... | —$C_2H_5$ | —$CH_2CH_2$— | —$CH_2CH_2CH_2$— | Do. |
| 31 | 6-$SO_2N(CH_3)_2$ | ...do... | —$C_2H_5$ | —$CH_2CH_2$— | —$CH_2CH_2CH_2$— | Do. |
| 32 | 6-$CH_3$ | ...do... | —$C_2H_5$ | —$CH_2CH_2$— | —$CH_2CH_2CH_2$— | Red. |
| 33 | None | ...do... | —$C_2H_5$ | —$CH_2CH_2$— | —$CH_2CH_2CH_2$— | Red. |
| 34 | 6-$OCH_3$ | ...do... | —$C_2H_5$ | —$CH_2CH_2$— | —$CH_2CH_2CH_2$— | Red. |
| 35 | 6-$OCH_3$ | ...do... | —$C_2H_5$ | —$CH_2CH_2$— | —$CH_2CH_2CH_2$— | Red. |
| 36 | 6-$SO_2CH_2CH_2CN$ | ...do... | —$C_2H_5$ | —$CH_2CH_2$— | —$CH_2CH_2CH_2$— | Pink. |
| 37 | 4,6-dichloro | ...do... | —$C_2H_5$ | —$CH_2CH_2$— | —$CH_2CH_2CH_2$— | Red. |
| 38 | 6-bromo | ...do... | —$C_2H_5$ | —$CH_2CH_2$— | —$CH_2CH_2CH_2$— | Red. |
| 39 | 4,6-dimethyl | ...do... | —$C_2H_5$ | —$CH_2CH_2$— | —$CH_2CH_2CH_2$— | Red. |
| 40 | 6-$SCH_2CH_2CN$ | ...do... | —$C_2H_5$ | —$CH_2CH_2$— | —$CH_2CH_2CH_2$— | Red. |
| 41 | 6-$NHCOCH_3$ | ...do... | —$C_2H_5$ | —$CH_2CH_2$— | —$CH_2CH_2CH_2$— | Red. |
| 42 | 4-$CH_3$-6-$NO_2$ | ...do... | —$C_2H_5$ | —$CH_2CH_2$— | —$CH_2CH_2CH_2$— | Violet. |
| 43 | 6-$NO_2$ | ...do... | —$C_2H_5$ | —$CH_2CH_2$— | —$CH_2$—⟨⟩ | Do. |
| 44 | 6-$SO_2CH_3$ | ...do... | —$CH_2CHOHCN_2Cl$ | —$CH_2CH_2$— | —$CH_2CH_2CH_2$— | Red. |
| 45 | 6-$SO_2CH_3$ | Phenylene | —$CH_2CHOHCN_2Cl$ | —$CH_2CH_2$— | —$CH_2CH_2CH_2$— | Red. |

It will be apparent from the above description of the invention that in the azo compounds having the general formula above, the substituents attached to R, $R_1$, $R_2$, $R_3$ and Z are not critical and serve primarily as auxochrome groups to control the color of the azo compounds, and compounds which contain the disclosed substituents are especially useful as textile dyes. The fundamental properties of the azo compounds are attributed to the whole molecule of the azo compound to which the radical

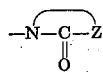

is indirectly attached.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Cellulose esters which can be dyed with the azo compounds include cellulose aliphatic carboxylic acid esters having 2 to 4 carbon atoms in the acyl groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C. Nylon, in fiber yarn and fabric form, is representative of polyamides which can be dyed with the azo compounds.

The invention has been described in considerable detail with particular reference to certain preferred embodiments thereof, but it will be understood that variations and modifications can be effected within the spiirt and scope of the invention as described hereinabove, and as defined in the appended claims.

What we claim is:
1. Azo compounds having the formula

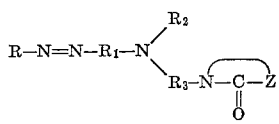

wherein:

R = a 2-benzothiazolyl radical,
$R_1$ = a phenylene radical,
$R_2$ = a member of the class consisting of hydrogen and a lower alkyl radical,
$R_3$ = lower alkylene, and
Z = the carbon atoms which with

complete a pyrrolidinono radical, a piperidono radical, or a phthalimidino radical, said compounds being free of water-solubilizing groups.

2. Azo compounds having the formula of claim 1 wherein $R_2$ represents a lower alkyl radical and Z represents the carbon atoms which with

complete a pyrrolidino radical.

3. Azo compounds having the formula

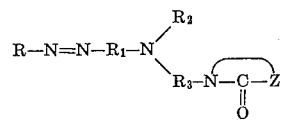

wherein:

R = a 2-benzothiazolyl radical,
$R_1$ = a p-phenylene radical,
$R_2$ = lower alkyl,
$R_3$ = lower alkylene, and
Z = the carbon atoms which with

complete a pyrrolidinone radical, said compounds being free of water-solubilizing groups.

4. The azo compound having the formula

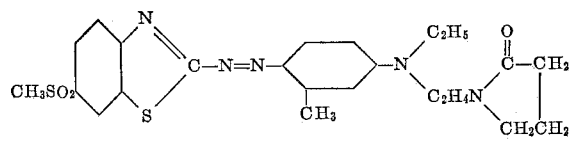

5. The azo compound having the formula

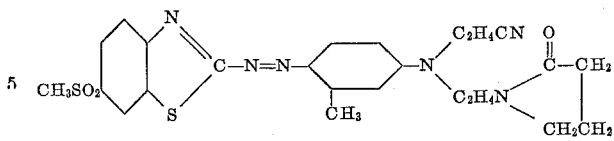

6. The azo compound having the formula

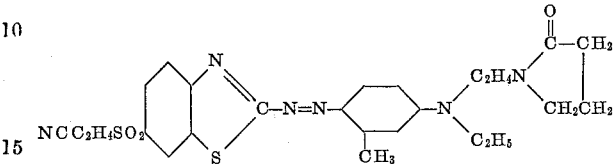

7. The azo compound having the formula

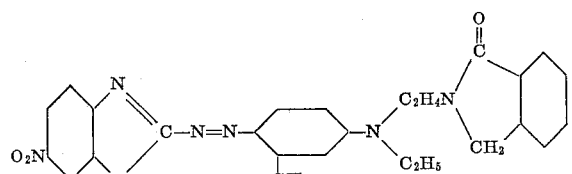

8. The azo compound having the formula

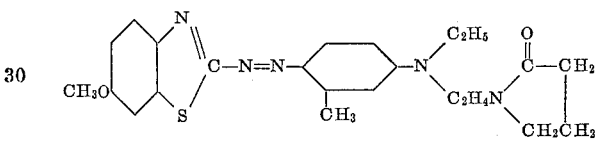

9. The azo compound having the formula

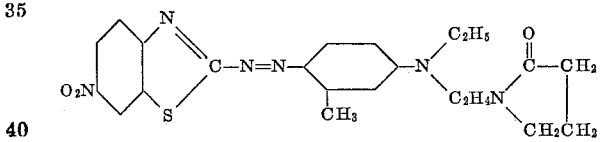

10. The azo compound having the formula

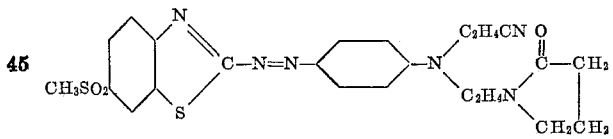

References Cited
UNITED STATES PATENTS
3,161,631  12/1964  Straley et al _____ 260—158

CHARLES B. PARKER, *Primary Examiner.*

D. PAPUGA, *Assistant Examiner.*